(12) United States Patent
Schmidt (10) Patent No.: US 10,196,132 B2
(45) Date of Patent: Feb. 5, 2019

(54) AIRCRAFT LANDING GEAR ASSEMBLY (71) Applicant: SAFRAN LANDING SYSTEMS UK LTD, Gloucester (GB)

(72) Inventor: Robert Kyle Schmidt, Gloucester (GB)

(73) Assignee: SAFRAN LANDING SYSTEMS UK LTD, Gloucestershire (GB)

( * ) Notice: Subject to any disclaimer, the term of this patent is extended or adjusted under 35 U.S.C. 154(b) by 351 days.

(21) Appl. No.: 15/239,313

(22) Filed: Aug. 17, 2016

(65) Prior Publication Data
US 2017/0057623 A1    Mar. 2, 2017

(30) Foreign Application Priority Data

Aug. 25, 2015 (EP) .................................. 15182431

(51) Int. Cl.
*B64C 25/26* (2006.01)
*B64C 25/12* (2006.01)
*B64C 25/20* (2006.01)

(52) U.S. Cl.
CPC .............. *B64C 25/26* (2013.01); *B64C 25/12* (2013.01); *B64C 25/20* (2013.01)

(58) Field of Classification Search
CPC ......... B64C 25/12; B64C 25/20; B64C 25/10; B64C 25/26; B64C 25/60; B64C 25/58; B64C 25/34

See application file for complete search history.

(56) References Cited

U.S. PATENT DOCUMENTS

| | | | | | |
|---|---|---|---|---|---|
| 2,422,576 | A | * | 6/1947 | Martin | B64C 25/26 244/102 SL |
| 2,437,135 | A | * | 3/1948 | Blair | B64C 25/30 244/102 R |
| 2,567,114 | A | * | 9/1951 | Linn | B64C 25/26 24/598.1 |
| 2,660,029 | A | * | 11/1953 | Geyer | F15B 13/10 244/102 R |
| 2,826,381 | A | * | 3/1958 | Cruz | B64C 25/34 244/102 SL |

(Continued)

FOREIGN PATENT DOCUMENTS

| | | |
|---|---|---|
| DE | 202013105380 | 2/2014 |
| GB | 514051 | 4/1938 |
| WO | 2014177276 | 11/2014 |

OTHER PUBLICATIONS

European Search Report for EP 15182431, dated Feb. 12, 2016, 5 pages.

*Primary Examiner* — Medhat Badawi
(74) *Attorney, Agent, or Firm* — RatnerPrestia (57) ABSTRACT

An aircraft landing gear assembly having a main strut configured to move between a deployed condition and a stowed condition, a damping device to oppose movement of the main strut as it approaches the deployed condition, a retraction actuator and a mechanical retraction linkage coupled between the aircraft and the main strut, and a locking device. The locking device is operable to change the retraction linkage between a locking condition in which the retraction actuator can apply a stowing force to the main strut through the retraction linkage to move the main strut from the deployed condition to the stowed condition, and an extensible condition in which the retraction linkage permits the main strut to be deployed by way of gravity.

15 Claims, 3 Drawing Sheets

(56) References Cited

U.S. PATENT DOCUMENTS

| | | | | |
|---|---|---|---|---|
| 2,930,552 A * | 3/1960 | Hartel | ............... | B64C 25/34 244/103 R |
| 2,943,820 A * | 7/1960 | Westcott, Jr. | ............... | B64C 25/34 244/103 R |
| 2,970,792 A * | 2/1961 | Holmes | ............... | B64C 25/505 244/50 |
| 3,195,840 A * | 7/1965 | Tollar | ............... | B64C 25/34 244/102 R |
| 3,488,020 A * | 1/1970 | Scherer | ............... | B64C 25/50 244/102 R |
| 3,504,406 A * | 4/1970 | Schott | ............... | B64C 25/26 24/603 |
| 3,556,440 A * | 1/1971 | Lallemant | ............... | B64C 25/14 244/104 R |
| 3,643,898 A * | 2/1972 | Whitener | ............... | B64C 25/34 244/50 |
| 3,652,040 A * | 3/1972 | Hartel | ............... | B64C 25/60 177/141 |
| 3,784,131 A * | 1/1974 | Stratford | ............... | B64C 25/62 244/102 R |
| 3,899,147 A * | 8/1975 | Masclet | ............... | B64C 25/20 244/102 R |
| 3,904,153 A * | 9/1975 | Watts | ............... | B64C 25/18 244/102 SL |
| 4,004,762 A * | 1/1977 | Jenkins | ............... | B64C 25/60 244/104 FP |
| 4,049,222 A * | 9/1977 | Peterson | ............... | B64D 1/04 244/137.4 |
| 4,147,316 A * | 4/1979 | Kendall | ............... | B64C 25/10 244/102 R |
| 4,155,523 A * | 5/1979 | Morford | ............... | B64C 25/36 188/4 R |
| 4,296,897 A * | 10/1981 | Thompson | ............... | B60T 11/34 188/181 T |
| 4,328,939 A * | 5/1982 | Davies | ............... | B64C 25/12 244/102 R |
| 4,359,199 A * | 11/1982 | Kramer | ............... | B64C 25/34 244/100 R |
| 4,556,179 A * | 12/1985 | Veaux | ............... | B64C 25/22 244/102 A |
| 4,720,063 A * | 1/1988 | James | ............... | B64C 25/14 244/102 R |
| 4,749,152 A * | 6/1988 | Veaux | ............... | B64C 25/60 188/321.11 |
| 4,770,372 A * | 9/1988 | Ralph | ............... | B64C 25/60 244/102 R |
| 4,892,270 A * | 1/1990 | Derrien | ............... | B64C 25/34 244/103 R |
| 4,907,760 A * | 3/1990 | Sealey | ............... | B64C 25/60 244/100 R |
| 5,022,609 A * | 6/1991 | Cranston | ............... | B64C 25/12 244/102 R |
| 5,027,928 A * | 7/1991 | Poucher | ............... | B64C 25/60 188/266.4 |
| 5,100,083 A * | 3/1992 | Large | ............... | B64C 25/34 244/102 R |
| 5,184,465 A * | 2/1993 | Howard | ............... | B64C 25/22 244/102 R |
| 5,279,480 A * | 1/1994 | Derrien | ............... | B64C 25/60 188/313 |
| 5,288,037 A * | 2/1994 | Derrien | ............... | B64C 25/26 244/102 SL |
| 5,333,816 A * | 8/1994 | Del Monte | ............... | B64C 25/50 244/102 R |
| 5,360,185 A * | 11/1994 | Derrien | ............... | B64C 13/28 192/76 |
| 5,429,323 A * | 7/1995 | Derrien | ............... | B64C 25/14 244/102 R |
| 5,460,340 A * | 10/1995 | White | ............... | B64C 25/00 244/102 A |
| 5,595,359 A * | 1/1997 | Meneghetti | ............... | B64C 25/50 244/103 R |
| 5,613,651 A * | 3/1997 | Meneghetti | ............... | B64C 25/50 244/100 R |
| 5,743,491 A * | 4/1998 | Meneghetti | ............... | B64C 25/34 244/102 A |
| 6,065,719 A * | 5/2000 | Ralph | ............... | B64C 25/34 180/24.1 |
| 6,120,009 A * | 9/2000 | Gatehouse | ............... | B64C 25/60 267/64.11 |
| 6,123,292 A * | 9/2000 | Ralph | ............... | B64C 25/34 244/103 R |
| 6,149,100 A * | 11/2000 | Ralph | ............... | B64C 25/34 244/103 R |
| 6,168,113 B1 * | 1/2001 | Hann | ............... | B64C 25/26 244/100 R |
| 6,173,920 B1 * | 1/2001 | Meneghetti | ............... | B64C 25/34 244/100 R |
| 6,182,925 B1 * | 2/2001 | Kilner | ............... | B64C 25/001 244/102 SL |
| 6,279,853 B1 * | 8/2001 | Brighton | ............... | B64C 25/26 244/102 R |
| 6,279,854 B1 * | 8/2001 | Lindahl | ............... | B64C 25/22 244/100 R |
| 6,308,916 B1 * | 10/2001 | Hrusch | ............... | B64C 25/22 244/102 R |
| 6,360,990 B1 * | 3/2002 | Grossman | ............... | B64C 25/12 244/102 R |
| 6,854,689 B1 * | 2/2005 | Lindahl | ............... | B64C 25/16 244/102 R |
| 7,066,429 B2 * | 6/2006 | Mellor | ............... | B64C 25/10 244/102 R |
| 8,123,161 B1 * | 2/2012 | Collins | ............... | B64C 25/26 244/102 R |
| 8,376,267 B2 * | 2/2013 | Coles | ............... | B64C 25/34 244/100 R |
| 8,505,849 B2 * | 8/2013 | Dubuisson | ............... | B64C 25/14 244/102 A |
| 8,523,106 B2 * | 9/2013 | Thompson | ............... | B64C 25/14 244/102 A |
| 8,590,835 B2 * | 11/2013 | Ditzler | ............... | B64C 25/26 244/102 R |
| 8,651,417 B2 * | 2/2014 | Hilliard | ............... | B64C 25/34 244/100 R |
| 8,814,094 B2 * | 8/2014 | Tran | ............... | B64C 25/26 244/100 R |
| 8,939,400 B2 * | 1/2015 | Mellor | ............... | B64C 25/00 244/100 R |
| 9,145,204 B2 * | 9/2015 | Ducos | ............... | B64C 25/26 |
| 9,162,756 B2 * | 10/2015 | Menezes | ............... | B64C 25/34 |
| 9,234,535 B2 * | 1/2016 | Kim | ............... | F15B 15/06 |
| 9,290,265 B2 * | 3/2016 | Martin | ............... | B64C 25/50 |
| 9,816,537 B2 * | 11/2017 | Kim | ............... | F15B 15/02 |
| 2003/0033927 A1 * | 2/2003 | Bryant | ............... | B64C 25/001 91/471 |
| 2003/0164422 A1 * | 9/2003 | Collet | ............... | B64C 25/26 244/102 R |
| 2004/0129834 A1 * | 7/2004 | Luce | ............... | B64C 25/60 244/100 R |
| 2007/0057117 A1 * | 3/2007 | Payen | ............... | B64C 25/00 244/100 R |
| 2009/0050736 A1 * | 2/2009 | Bennett | ............... | B64C 25/22 244/102 R |
| 2010/0012779 A1 * | 1/2010 | Collins | ............... | B64C 25/12 244/102 R |
| 2010/0116930 A1 * | 5/2010 | Griffin | ............... | B64C 25/34 244/102 A |
| 2010/0257923 A1 * | 10/2010 | Bennett | ............... | B64C 25/00 73/117.03 |
| 2010/0282901 A1 * | 11/2010 | Mason | ............... | B64C 25/18 244/102 R |
| 2011/0042511 A1 * | 2/2011 | Elliott | ............... | B64C 25/30 244/102 R |
| 2011/0233327 A1 * | 9/2011 | Mellor | ............... | B64C 25/34 244/102 A |
| 2011/0233328 A1 * | 9/2011 | Alleau | ............... | B64C 25/24 244/102 R |

(56) References Cited

U.S. PATENT DOCUMENTS

| | | | | |
|---|---|---|---|---|
| 2011/0303787 A1* | 12/2011 | Bennett | ............... | B64C 25/00 |
| | | | | 244/100 R |
| 2012/0126055 A1* | 5/2012 | Lindahl | ............... | B64C 25/22 |
| | | | | 244/104 FP |
| 2012/0137802 A1* | 6/2012 | Balducci | ............... | B64C 25/24 |
| | | | | 74/89.23 |
| 2012/0193470 A1* | 8/2012 | Kosheleff | ............... | B64C 1/0009 |
| | | | | 244/102 R |
| 2012/0326894 A1* | 12/2012 | Schmidt | ............... | B64C 25/50 |
| | | | | 340/960 |
| 2013/0105624 A1* | 5/2013 | Dubois | ............... | B64C 25/24 |
| | | | | 244/102 R |
| 2013/0299633 A1* | 11/2013 | Tierney | ............... | B64C 25/26 |
| | | | | 244/102 SL |
| 2014/0209738 A1* | 7/2014 | Blanpain | ............... | B64C 25/20 |
| | | | | 244/102 A |
| 2015/0041587 A1* | 2/2015 | Schmidt | ............... | B64C 25/12 |
| | | | | 244/102 A |
| 2015/0298798 A1* | 10/2015 | Holloway | ............... | B64C 25/10 |
| | | | | 244/102 R |
| 2016/0023750 A1* | 1/2016 | Thompson | ............... | B64C 25/14 |
| | | | | 244/102 A |
| 2016/0027225 A1* | 1/2016 | Fazeli | ............... | F15B 19/005 |
| | | | | 701/34.4 |
| 2016/0194078 A1* | 7/2016 | Hilliard | ............... | B64C 25/001 |
| | | | | 244/102 A |
| 2016/0347444 A1* | 12/2016 | Vatovec | ............... | B64C 25/20 |
| 2017/0057623 A1* | 3/2017 | Schmidt | ............... | B64C 25/12 |

* cited by examiner

AIRCRAFT LANDING GEAR ASSEMBLY

This application claims the benefit of and priority to European Application 15182431.5, filed Aug. 25, 2015, the contents of which are incorporated herein by reference.

BACKGROUND TO THE INVENTION

An aircraft can generate considerable noise during a landing approach. A significant portion of this noise can be attributable to air flowing around the deployed landing gear. Although the aircraft may be travelling at around 80 m/s during the landing approach, the localised airflow around a noise-inducing component or region of the landing gear may reach speeds of around 300 m/s, which can result in considerable noise. This is known in the art, and will be referred to herein, as aero-acoustic noise. Aero-acoustic noise is particularly undesirable because of the fact that airports are often located close to cities, or other densely populated areas.

SUMMARY OF THE INVENTION

According to a first aspect of the invention there is provided an aircraft landing gear assembly comprising:
- a main strut having a first end region arranged to be movably coupled to an aircraft such that the main strut can be moved between a deployed condition, for take-off and landing, and a stowed condition for flight;
- a damping device arranged to oppose movement of the main strut as it approaches the deployed condition;
- a retraction actuator arranged to be coupled to one of the main strut and the aircraft;
- a mechanical retraction linkage coupled to the retraction actuator via a first joint and coupled to a second one of the main strut and the aircraft via a second joint; and
- a locking device operable to change the retraction linkage between:
  - a locking condition in which the retraction linkage inhibits relative movement between the first joint and second joint in at least one direction along a linkage axis intersecting the first and second joints such that the retraction actuator can apply a stowing force to the main strut through the retraction linkage to move the main strut from the deployed condition to the stowed condition; and
  - an extensible condition in which the retraction linkage permits relative movement between the first joint and the second joint independently of the extension state of the retraction actuator while remaining coupled to the first joint and the second joint such that the main strut can be deployed by way of gravity.

Thus, the landing gear assembly according to the first aspect is configured to be routinely deployed by gravity, which can increase the speed of deployment and thus enable the landing gear to be deployed later in the landing approach, which in turn can decrease the duration of aero-acoustic noise generated during a landing approach. The retraction linkage can be switched from the locking state to the extensible state, allowing the first and second joints to move towards or away from one another along the linkage axis such that the main strut falls by way of gravity towards the deployed condition. Before assuming the deployed condition, the damping device slows the main strut to reduce impact loads as the strut becomes fully deployed. The main strut can be locked in the deployed condition by one or more conventional stay and lock link mechanisms. Following take off, the retraction actuator can use the retraction linkage, which remains mechanically coupled to the main strut and retraction actuator throughout gravity deployment by way of the first and second joints, to retract the landing gear by reengaging the locking device to fix the degree of separation between the first and second joints. Moreover, since the retraction linkage permits relative movement between the first joint and the second joint independently of the extension state of the retraction actuator, the landing gear can be fully deployed even in the event that the retraction actuator jams in a fully or partially retracted extension state.

The retraction linkage can be arranged such that the first and second joints are relatively close when in the locking condition and are free to become relatively spaced when in the extensible condition, as the main strut moves towards the deployed condition. This arrangement results in the retraction actuator placing the linkage in tension when retracting the main strut, which can lead to a simplified arrangement in comparison to an assembly configured to push the gear into the stowed condition via a linkage which is locked in a relatively extended state.

The first joint can be coupled to an end region of the retraction actuator. The retraction actuator can be distinct from and coupled in series with the retraction linkage.

The retraction linkage can comprise a rigid, elongate guide member defining a channel, the first joint comprising a runner captively mounted within the channel which is free to move along the channel when the retraction linkage is in the extensible condition. This arrangement enables the retraction linkage to be controlled in terms of its position during operation. The channel can extend in a linear manner.

The locking device can comprise a clamp arranged to lock the runner at a position within the channel to place the retraction linkage in the locked condition.

Alternatively, the guide member can include a trap in communication with one end region of the channel into which the runner can fall by way of gravity in order to place the retraction linkage in the locked condition. This arrangement enables the retraction actuator to move the runner along the channel to reengage the runner within the trap following gravity deployment for retracting the landing gear by simple extension of the retraction actuator. The portion of the guide member which defines the channel can be formed from carbon fibre or the like, while the portion defining the trap can be formed from a metal such as titanium or steel.

The locking device can comprise an unlock actuator arranged to move the guide member relative to the runner to place the retraction linkage in the unlocked condition. The unlock actuator can directly push the runner out of the trap, or can change the orientation of the guide member to align the runner with an extensions portion of the guide channel.

The retraction actuator can be arranged to be pivotally coupled to the aircraft. The second joint can be a pivotal coupling between the guide member and main strut.

The retraction linkage can comprise a flexible tether.

The locking device can comprise a clamp arranged to lock the tether to set the distance between the first and second joints.

The damping device can be a dashpot or the like arranged to act directly on the main strut as the main strut moves to assume the deployed condition.

Alternatively, the damping device can form part of the retraction linkage; for example, an arrest device arranged to dampen movement of the runner relative to the channel upon the runner reaching a predefined point along the channel.

The retraction actuator can be an electro-mechanical actuator, such as a lead screw or ball screw actuator. If so selected, a lead screw can be chosen that is not 'back driveable' and stopping the actuator will stop the gear. This can be exploited to eliminate the up lock, holding the landing gear in the stowed condition by way of the retraction actuator.

A second actuator or biasing device can be provided, which is configured to apply a force in the opposite direction with respect to the damping device in order to ensure the side stay and lock links go over centre in order to lock the strut in the deployed condition.

The strut can comprise a shock strut.

According to a second aspect of the invention, there is provided an aircraft including one or more landing gear according to earlier aspects of the invention.

In accordance with a third aspect of the present invention, there is provided a method of routinely moving an aircraft landing gear assembly according to the first aspect from a stowed condition within an aircraft to a deployed condition for landing, the method comprising:

operating the locking device to place the retraction linkage in the extensible condition such that the landing gear deploys by way of gravity.

The step of operating the locking device can be carried out while the retraction actuator is jammed.

The method can include a step of subsequently extending the retraction actuator while the landing gear is moving towards or has assumed the deployed condition.

The method can include a step of extending the retraction actuator along a guide channel to an extension state in which an end region of the actuator engages with a hook at one end region of the guide channel to place the retraction linkage in the locked condition, in some cases by way of gravity.

The method can include a step of, with the retraction linkage in the locked condition, operating the retraction actuator following take off to withdraw the landing gear via the retraction linkage.

In accordance with a fourth aspect of the present invention, there is provided a method of routinely moving an aircraft landing gear assembly according to the first aspect from a deployed condition to a stowed condition for flight of an aircraft, the method comprising:

with the retraction linkage in the locked condition, operating the retraction actuator following take off to withdraw the landing gear via the retraction linkage.

Optional features of the first aspect can be applied to the third and fourth aspects in an analogous manner.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
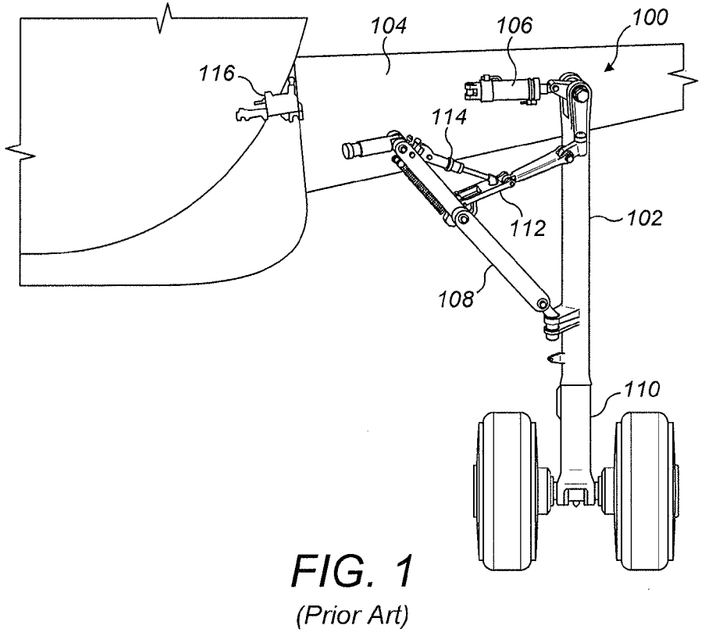
FIG. 1 is a diagram of a conventional landing gear assembly.

Referring to FIG. 1, a conventional aircraft landing gear assembly is shown generally at 100. The aircraft landing gear assembly 100 is movable between a deployed condition, as illustrated in FIG. 1, for take-off and landing, and a stowed condition (not shown) for flight.

A main strut 102 is pivotally coupled, at a top end, to the airframe 104 and at a bottom end carries a wheel and brake assembly 110, or other suitable ground contacting assembly.

A hydraulic or electromechanical retraction actuator 106 is coupled between the airframe 104 and the main strut 102 such that extension and retraction of the retraction actuator 106 results in movement of the main strut 102 between the deployed and stowed conditions. In addition to providing a motive force for retraction of the main strut 102, the retraction actuator 106 and also provides extension damping.

A brace or stay 108 is generally provided to support the orientation of the main strut 102 when the landing gear is in the deployed condition. The stay 108 is a two bar linkage that can be unfolded to assume a generally aligned, over centre condition in which the stay 108 is locked to inhibit movement of the main strut 102. When the stay 108 is broken, it no longer reacts movement of the main strut 102 and the main strut 102 can be moved by the retraction actuator 106 to the stowed condition.

A lock link 112 is generally provided in conjunction with each stay 108 to maintain the stay 108 in the locked condition. A lock link 112 generally includes a two bar linkage that can be unfolded to assume a locked over centre condition to inhibit movement of the stay 108. The lock link 112 must be broken by a lock-stay actuator 114 to enable the stay 108 to be folded, thereby permitting the main strut 102 to be moved by the retraction actuator 106 towards the stowed condition.

An up-lock 116 retains the landing gear in the stowed condition.

The present inventor has identified that the rate at which the retraction actuator 106 can extend can adversely affect the rate at which the landing gear assembly 100 can be deployed. As such, the landing gear assembly 100 is deployed relatively early in a landing sequence, during which time aero-acoustic noise is generated.

Figure 2:
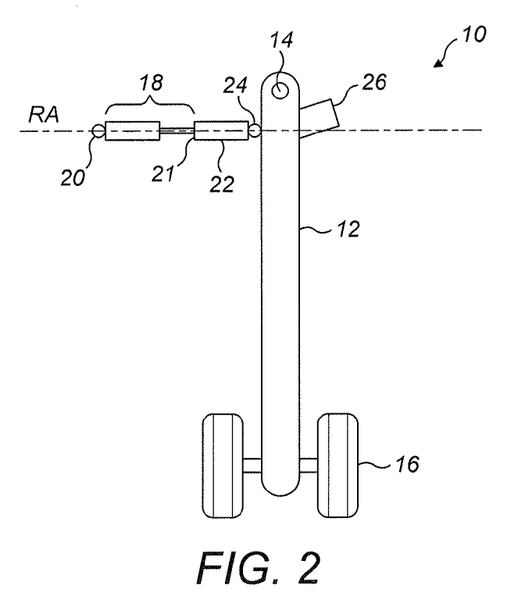
FIG. 2 is a diagram of a landing gear assembly according to an embodiment of the invention.

With this in mind, the present inventor has devised a new type of aircraft landing gear assembly shown generally at 10 in FIG. 2, which is arranged to be routinely deployed by way of gravity. This can result in a relatively fast deployment of the landing gear assembly 10, which enables the landing gear assembly to be deployed later in the landing approach, thereby reducing the duration of aero-acoustic noise associated with the landing approach. Moreover, the landing gear assembly 10 can be deployed in a more reliable manner than some conventional landing gear assemblies.

The landing gear assembly 10 according to embodiments of the invention is similar to the conventional landing gear assembly 100 described above. For brevity, the following description will focus on the differences between the landing gear assembly 10 and the conventional landing gear assembly 100.

A retraction actuator 18 is pivotally coupled at one end to the airframe via a pivot joint 20. The opposite end of the retraction actuator 18 is coupled to the main strut 12 indirectly via a retraction linkage 22, which is distinct from and coupled in series with the retraction actuator 18. The retraction linkage 22 is coupled to the retraction actuator 18 via a first joint 21 and pivotally coupled to the main strut 12 via a second joint 24.

A locking device (not shown) is operable to change the retraction linkage 22 between a locking condition and an extensible condition.

When in the locking condition, the retraction linkage 22 inhibits relative movement, in this case separation, between the first joint 21 and second joint 24 along a linkage axis RA that intersects and moves with the first 21 and second joints 24 such that the retraction actuator 18 can apply a stowing force to the main strut 12 through the retraction linkage 22 to move the main strut 12 from the deployed condition to the stowed condition.

When in the extensible condition, the retraction linkage 22 permits separation between the first joint 21 and the second joint 24 such that the main strut 12 can be deployed by way of gravity. However, the retraction linkage 22 remains coupled to the first joint 21 and the second joint 24 as the landing gear deploys to simplify retraction.

A damping device or dashpot 26 which is distinct from the retraction actuator 18 is provided to oppose and damp movement of the main strut 12 as it approaches the deployed condition. The landing gear can therefore freefall into lock with the final portion of its extension being damped by the specific damper 26. The damper 26 is shown as being attached between the main strut 12 and the aircraft, but can be attachable elsewhere, potentially employing a lost motion device. In some embodiments the damping device can be formed as part of the retraction linkage 22.

Figure 3A:
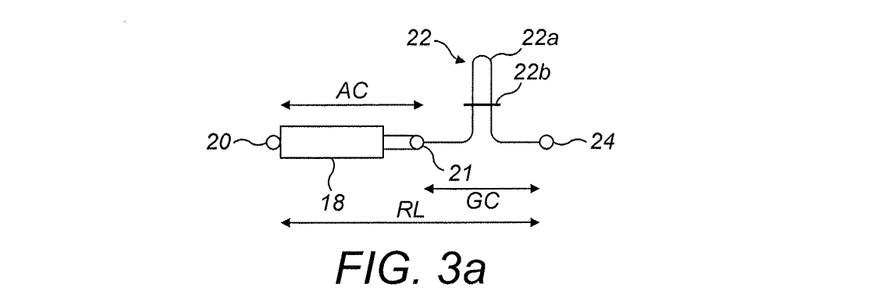
FIGS. 3a to 3c show the retraction linkage and retraction actuator configuration of the embodiment of FIG. 2.
Figure 3B:
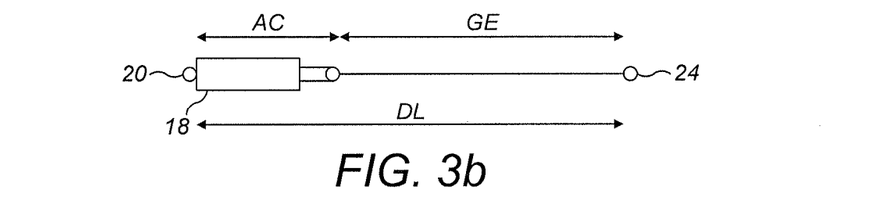

FIGS. 3a to 3b illustrate one example of how the retraction linkage 22 and locking device can be implemented.

In this example, the retraction linkage 22 includes a flexible member 22a of fixed length, such as a steel chord or wire, that can be manipulated by an actuator (not shown) to a relatively contracted state GC between the first and second joints 21, 24 as shown in FIG. 3a and locked in that condition by a suitable locking device 22b such as a clamp or the like. With the retraction actuator 18 in a relatively contracted state AC, the distance between the retraction assembly coupling points 20, 24 is a retracted length RL in which the main strut 12 is in the stowed condition.

When it is desired to deploy the landing gear assembly 10, the locking device 22b is operated to release the flexible member 22a such that the flexible member 22a of the retraction linkage 22 can assume a relatively extended state GE, as shown in FIG. 3b. Even with the retraction actuator 18 remaining in the relatively contracted state AC, the distance between the retraction assembly coupling points 20, 24 is now a deployed length DL in which the main strut 12 is in the deployed condition.

Figure 3C:
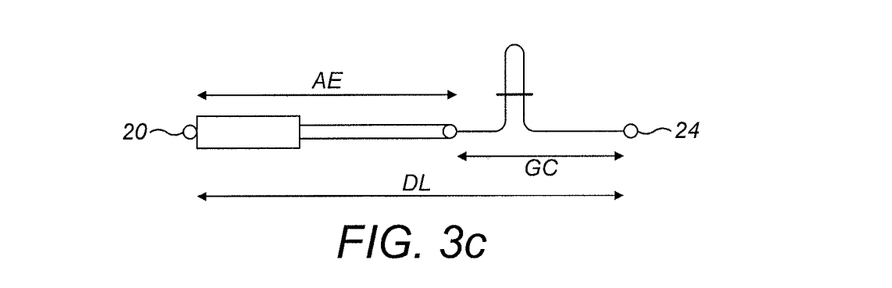

The retraction actuator 18 can be operated to assume a relatively extended state AE, as shown in FIG. 3c, enabling the flexible member 22 to be manipulated by the actuator (not shown) to the relatively contracted state GC and locked in that condition by the locking device 22b.

Thereafter, the retraction actuator 18 can be operated to assume the relatively contracted state AC in order to retract the main strut 12 via the contracted retraction linkage 22.

Figure 4A:
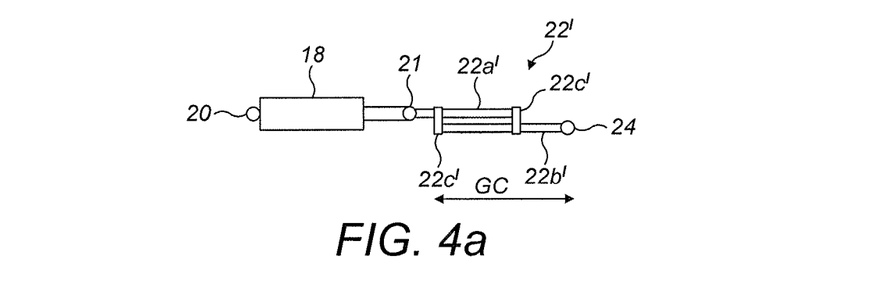
FIGS. 4a and 4b show the retraction linkage and retraction actuator configuration of a landing gear assembly according to a further embodiment of the invention.
Figure 4B:
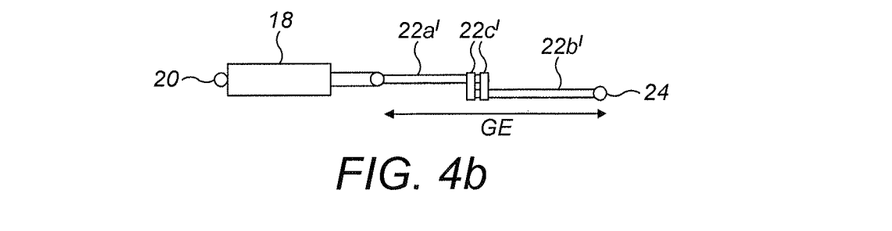

FIGS. 4a and 4b illustrate another example of how the retraction linkage can be implemented. In this example, the retraction linkage 22' includes a pair of elongate guide members 22a', 22b' movably coupled to one another via connectors 22c' so as to be movable relative to one another in an axial manner between a relatively contracted state GC, as shown in FIG. 4a, and a relatively extended state GE, as shown in FIG. 4b. The connectors 22c' can include a locking device such as a clamp for locking the position of the members 22a', 22b' relative to one another. Functionally, the retraction linkage 22' works in an analogous manner to the retraction linkage 22 of FIGS. 3a to 3c. The guide members can be formed from any suitable material; for example, a metal such as steel, aluminum or titanium.

Figure 5A:
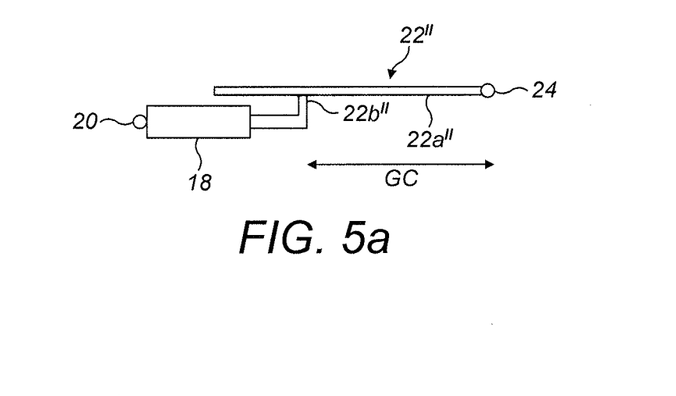
FIGS. 5a and 5b show the retraction linkage and retraction actuator configuration of a landing gear assembly according to a further embodiment of the invention.
Figure 5B:
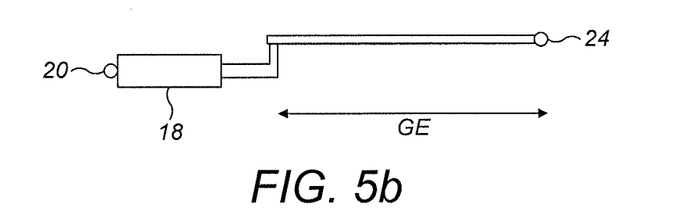

FIGS. 5a and 5b illustrate another example of how the retraction linkage can be implemented. In this example, the retraction linkage 22" includes a single elongate guide member 22a" pivotally coupled at one end to the main strut (not shown) via coupling 24. The other end of the guide member 22a" is free. The actuator 18 is movably coupled to the guide member 22a" via a runner 22b" such that the runner 22b" can slide or translate along a channel formed in the guide member 22a" in an axial manner between a relatively contracted state GC, as shown in FIG. 5a, and a relatively extended state GE, as shown in FIG. 5b. The runner 22b" can include a locking device such as a clamp for locking the position of the runner 22b" relative to guide member 22a". Functionally, the retraction linkage 22" works in an analogous manner to the retraction linkage 22 of FIGS. 3a to 3c, with the runner 22b" equating to the first joint 21.

Figure 6:
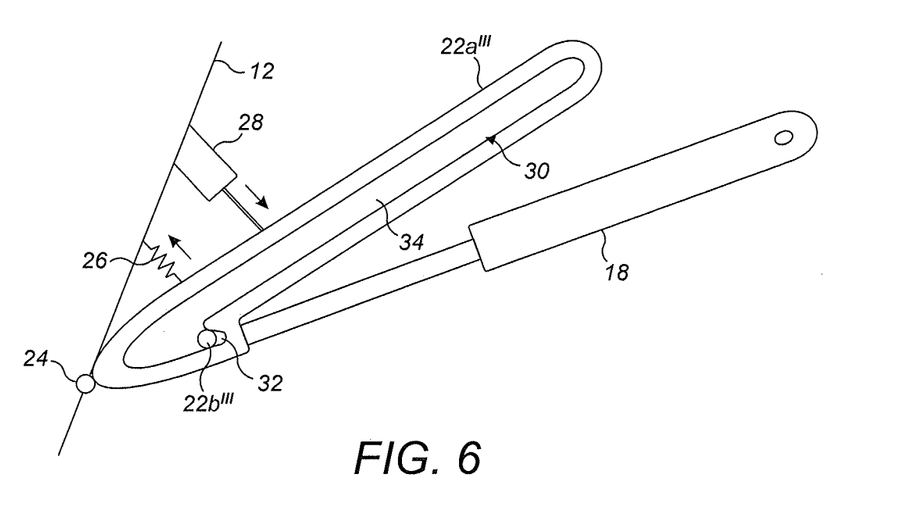
FIG. 6 shows the retraction linkage and retraction actuator configuration of a landing gear assembly according to a further embodiment of the invention.

As illustrated in FIG. 6, in another embodiment, which is similar to that shown in FIGS. 5a and 5b, the guide member 22a'" can include a channel 30 defining a guide within which a runner 22b'" provided at an end region of the retraction actuator 18 is movably confined. The channel 30 includes an extension portion 34 which is generally linear such that the runner 22b'" can move forwards and backwards along it unhindered. The end of the channel 30 which is closest to the strut 12 includes a hook portion 32 arranged such that, with the guide member 22a'" in a first orientation as shown in FIG. 6, which corresponds to a locking orientation, the runner 22b'" falls into the hook portion 32 by way of gravity upon the 18 retraction actuator assuming a particular extension state.

The hook portion 32 is shaped to retain the runner 22b'" such that during subsequent retraction, the actuator 18 pulls on the hook formation and therefore the guide member 22a'", thereby using it to retract the landing gear assembly. The hook portion 32 can be made of a strong material such as steel or CRES, whereas the extension portion 34 can be made from a thermoplastic or composite material as its function is not to take significant loads.

The guide member 22a'" is pivotally coupled to the main strut 12 at pivot 24 and biased by a spring or the like 26 to the first orientation in which the runner 22b'" remains within the hook portion of the channel due to gravity and the configuration of the hook portion 32.

In order to deploy the landing gear assembly, a release actuator 28 is energised to change the orientation of the guide member 22a'" so that the runner 22b'" moves out of the hook portion 32 and is thereafter free to ride along the extension portion 34 guide channel 30.

Embodiments of the invention which include a guide channel advantageously enable the runner 22'" to be automatically guided back to a locking location, such as the hook portion 32, upon extension of the retraction actuator 18, ready for landing gear retraction following take off.

Embodiments of the invention enable an electrical ball screw or lead screw actuator to be used as the retraction actuator without fear of a jam preventing normal deployment of the gear. If so selected, a lead screw can be chosen that is not 'back driveable' such that stopping the actuator will stop the gear. This can be exploited to eliminate the up lock, holding the landing gear in the stowed condition by way of the retraction actuator.

Although the described embodiments include a retraction linkage that is relatively short when the landing gear is stowed and relatively long when the gear is deployed, such that the retraction actuator pulls the gear towards the stowed condition with the linkage in tension, in other embodiments the opposite arrangement can be implemented where the retraction linkage that is relatively long when the landing gear is stowed and relatively short when the gear is deployed, such that the retraction actuator pushes the gear towards the stowed condition with the linkage in compression.

In other embodiments the retraction actuator can be coupled to the main strut and the retraction linkage coupled to the aircraft.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
a main strut having a first end region movably coupled to an aircraft such that the main strut is movable between a deployed condition, for take-off and landing, and a stowed condition for flight;
a damping device configured to oppose movement of the main strut as the main strut approaches the deployed condition;
a retraction actuator coupled to one of the aircraft and the main strut;
a mechanical retraction linkage coupled to the retraction actuator via a first joint and coupled to an opposite one of the aircraft or the main strut in comparison to the retraction actuator via a second joint; and
a locking device operable to change the retraction linkage between:
a locking condition in which the retraction linkage inhibits relative movement between the first joint and second joint in at least one direction along a linkage axis intersecting the first and second joints such that the retraction actuator is configured to apply a stowing force to the main strut through the retraction linkage to move the main strut from the deployed condition to the stowed condition; and
an extensible condition in which the retraction linkage permits relative movement between the first joint and the second joint independently of the extension state of the retraction actuator while remaining coupled to the first joint and the second joint such that the main strut is movable by way of gravity to the deployed condition.

2. The aircraft landing gear assembly according to claim 1, wherein the retraction linkage is configured such that the first and second joints are relatively close when in the locking condition and relatively spaced when in the extensible condition and the main strut has moved towards the deployed condition.

3. The aircraft landing gear assembly according to claim 1, wherein the first joint is coupled to an end region of the retraction actuator.

4. The aircraft landing gear assembly according to claim 1, wherein the retraction linkage comprises a rigid, elongate guide member defining a channel, the first joint comprising a runner captively mounted within the channel which is free to move along the channel when the retraction linkage is in the extensible condition.

5. The aircraft landing gear assembly according to claim 4, wherein the locking device comprises a clamp configured to lock the runner at a position within the channel to place the retraction linkage in the locked condition.

6. The aircraft landing gear assembly according to claim 4, wherein the guide member includes a trap channel in communication with one end region of the channel into which the runner is movable by way of gravity in order to place the retraction linkage in the locked condition.

7. The aircraft landing gear assembly according to claim 6, wherein the locking device comprises a retraction linkage actuator configured to push the runner out of the trap channel or change the orientation of the guide member to move runner out of the trap channel.

8. The aircraft landing gear assembly according to claim 1, wherein the second joint comprises a pivotal coupling between the guide member and main strut.

9. The aircraft landing gear assembly according to claim 1, wherein the retraction linkage comprises a flexible tether.

10. The aircraft landing gear assembly according to claim 9, wherein the locking device comprises a clamp configured to lock the tether to set the distance between the first and second joints.

11. The aircraft landing gear assembly according to claim 1, wherein the damping device comprises a dashpot configured to act directly on the main strut as the main strut moves to assume the deployed condition.

12. The aircraft landing gear assembly according to claim 1, wherein the retraction actuator comprises an electromechanical actuator, a leadscrew or a ballscrew actuator.

13. An aircraft including one or more aircraft landing gear assemblies, each aircraft landing gear assembly comprising:
a main strut having a first end region movably coupled to the aircraft such that the main strut is movable between a deployed condition, for take-off and landing, and a stowed condition for flight;
a damping device configured to oppose movement of the main strut as the main strut approaches the deployed condition;
a retraction actuator coupled to one of the aircraft and the main strut;
a mechanical retraction linkage coupled to the retraction actuator via a first joint and coupled to an opposite one of the aircraft or the main strut in comparison to the retraction actuator via a second joint; and
a locking device operable to change the retraction linkage between:
a locking condition in which the retraction linkage inhibits relative movement between the first joint and second joint in at least one direction along a linkage axis intersecting the first and second joints such that the retraction actuator is configured to apply a stowing force to the main strut through the retraction linkage to move the main strut from the deployed condition to the stowed condition; and an extensible condition in which the retraction linkage permits relative movement between the first joint and the second joint independently of the extension state of the retraction actuator while remaining coupled to the first joint and the second joint such that the main strut is movable by way of gravity to the deployed condition.

14. A method of moving an aircraft landing gear assembly from a stowed condition within an aircraft to a deployed condition for landing, the aircraft landing gear assembly comprising:

a main strut having a first end region movably coupled to the aircraft such that the main strut is movable between a deployed condition, for take-off and landing, and a stowed condition for flight;

a damping device configured to oppose movement of the main strut as the main strut approaches the deployed condition;

a retraction actuator coupled to one of the aircraft and the main strut;

a mechanical retraction linkage coupled to the retraction actuator via a first joint and coupled to an opposite one of the aircraft or the main strut in comparison to the retraction actuator via a second joint; and a locking device operable to change the retraction linkage between:

a locking condition in which the retraction linkage inhibits relative movement between the first joint and second joint in at least one direction along a linkage axis intersecting the first and second joints such that the retraction actuator is configured to apply a stowing force to the main strut through the retraction linkage to move the main strut from the deployed condition to the stowed condition; and an extensible condition in which the retraction linkage permits relative movement between the first joint and the second joint independently of the extension state of the retraction actuator while remaining coupled to the first joint and the second joint such that the main strut is movable by way of gravity to the deployed condition, the method comprising:

operating the locking device to place the retraction linkage in the extensible condition such that the landing gear deploys by way of gravity.

15. A method of moving an aircraft landing gear assembly from a deployed condition to a stowed condition for flight of an aircraft, the aircraft landing gear assembly comprising:

a main strut having a first end region movably coupled to the aircraft such that the main strut is movable between a deployed condition, for take-off and landing, and a stowed condition for flight;

a damping device configured to oppose movement of the main strut as the main strut approaches the deployed condition;

a retraction actuator coupled to one of the aircraft and the main strut;

a mechanical retraction linkage coupled to the retraction actuator via a first joint and coupled to an opposite one of the aircraft or the main strut in comparison to the retraction actuator via a second joint; and a locking device operable to change the retraction linkage between:

a locking condition in which the retraction linkage inhibits relative movement between the first joint and second joint in at least one direction along a linkage axis intersecting the first and second joints such that the retraction actuator is configured to apply a stowing force to the main strut through the retraction linkage to move the main strut from the deployed condition to the stowed condition; and an extensible condition in which the retraction linkage permits relative movement between the first joint and the second joint independently of the extension state of the retraction actuator while remaining coupled to the first joint and the second joint such that the main strut is movable by way of gravity to the deployed condition, the method comprising:

with the retraction linkage in the locked condition, operating the retraction actuator following take off to withdraw the landing gear via the retraction linkage.

* * * * *